Dec. 10, 1968     G. E. BOHIN     3,415,912
METHOD FOR DISPERSING ADDITIVES IN RUBBERS
Filed March 7, 1966     2 Sheets-Sheet 1
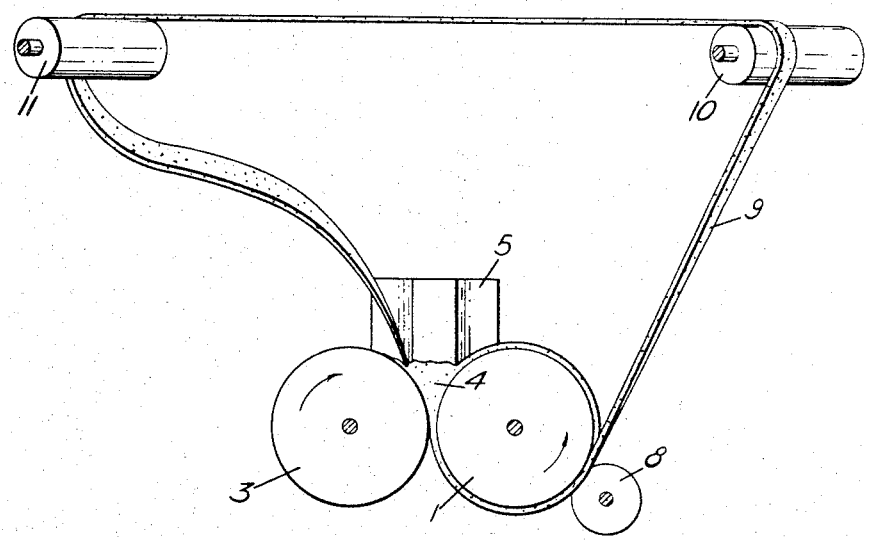
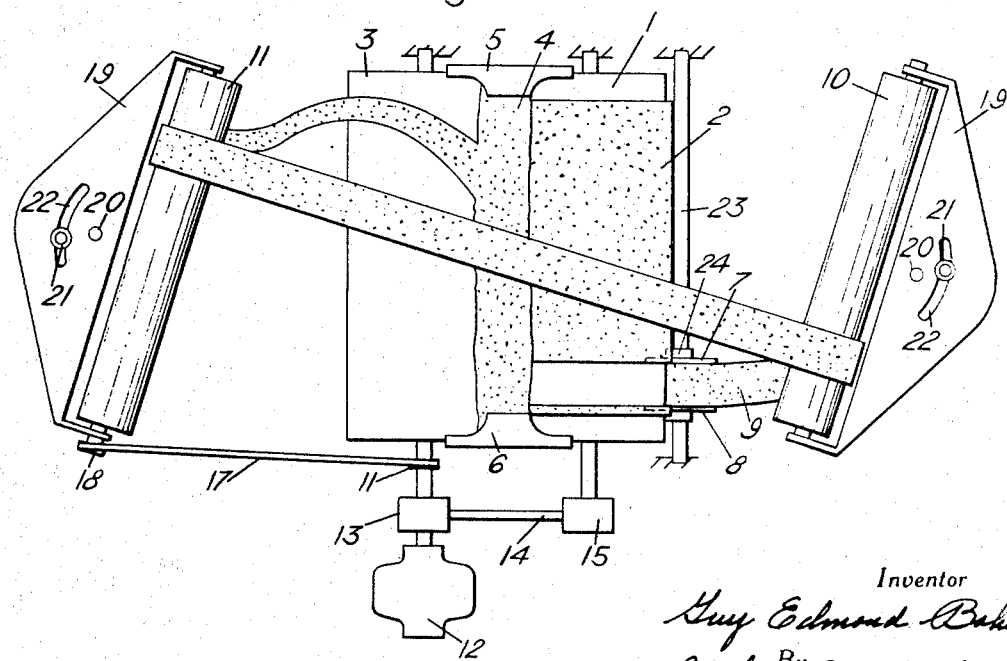
Inventor
Guy Edmond Bohin
By Cushman, Darby & Cushman
Attorneys Dec. 10, 1968  G. E. BOHIN  3,415,912
METHOD FOR DISPERSING ADDITIVES IN RUBBERS
Filed March 7, 1966  2 Sheets-Sheet 2
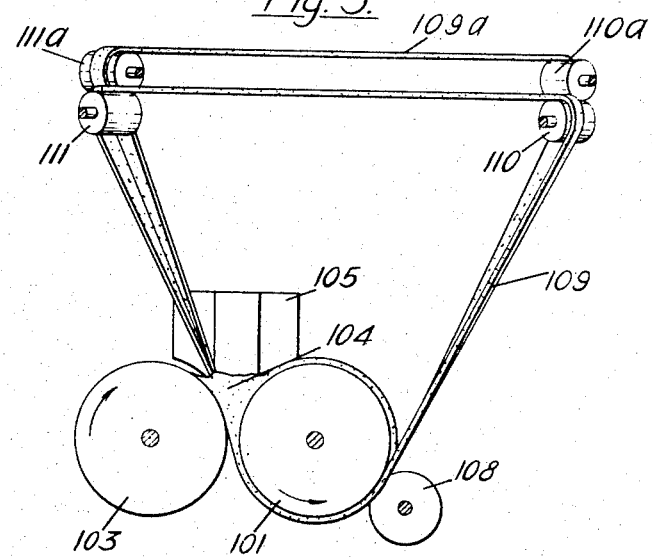
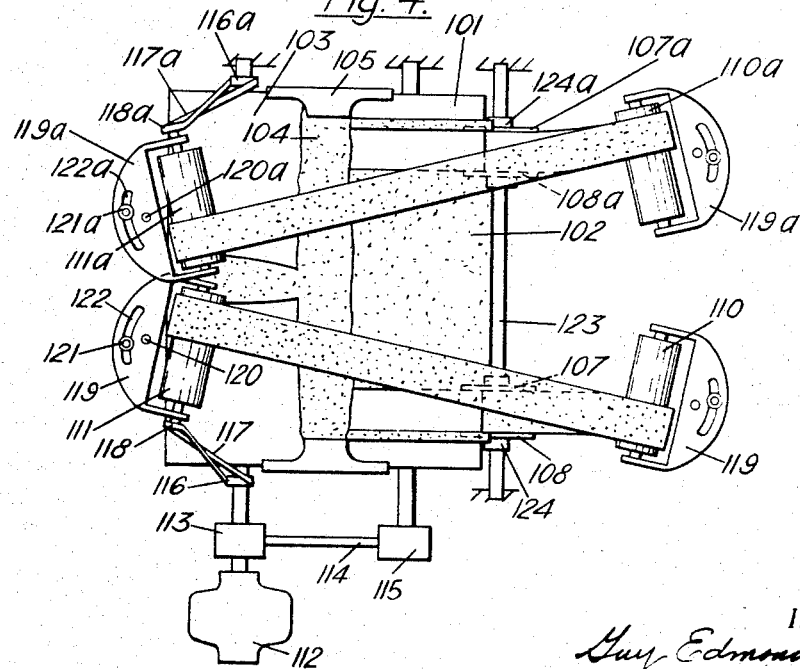

United States Patent Office 3,415,912
Patented Dec. 10, 1968

3,415,912
METHOD FOR DISPERSING ADDITIVES IN RUBBERS
Guy Edmond Bohin, Bron, France, assignor to Rhone-Poulenc S.A., Paris, France, a corporation of France
Filed Mar. 7, 1966, Ser. No. 532,415
Claims priority, application France, Mar. 10, 1965, 8,647
6 Claims. (Cl. 264—37)

ABSTRACT OF THE DISCLOSURE

The invention relates to a method of dispersing additives in rubber in which the rubber is fed batchwise together with an additive to the nip defined between a pair of closely spaced rolls mounted on parallel axes. A hide is thus formed by the rubber and additive on one of the rolls and the invention relates to the improvement of removing a thin strip which constitutes a small fraction of the width of the rolls and feeding this strip from one axial position to another axial position of the rolls where it is mixed with the remainder of the material located in the nip.

---

The present invention relates to a method and apparatus for dispersing solid, liquid or pasty additives, such as pigments, vulcanisation agents, or plasticisers in a rubber or in a mixture of rubber and additives, as is currently the practice in the rubber industry.

It is usual to add various additives to rubbers which are unvulcanised and which as a result generally do not have good mechanical properties. For certain rubbers or certain mixtures of rubbers and additives these mechanical properties and in particular the tensile strength at this stage of manufacture, that is to say in the raw state, are rather poor. This is more particularly the case for silicone rubbers.

A type of equipment very commonly used to incorporate additives, such as those referred to above, into a natural or synthetic rubber is an open mixer, also called a two-roll mill. The rubber or the mixture of rubber and additives wraps itself round one of the rolls forming a hide which feeds the material from the outside towards the middle zone between the two rolls, where it forms a pad. It is preferable that the additives to be incorporated are added in this zone. In order to assist their dispersion and better to work the mixture, a friction ratio is generally set up between the two rolls, i.e. one of them is caused to revolve more rapidly than the other.

Nevertheless it is only rarely that one can obtain very satisfactory results under these conditions. If the mixing time is reduced to an industrially practicable length a sufficient degree of homogenisation is not achieved, or conversely if one attempts above all to produce mixtures of suitable homogeneity, this is only possible at the expense of a prohibitive duration of the mixing time which results in an increase in costs and in low output of the equipment.

It is thus most frequently necessary to increase the mixing effect achieved by the frictional ratio between the two rolls by resorting to various manipulations. For example it is possible to cut, by means of a knife, oblique grooves in the hide of material which surrounds the roll, starting from the edges of the hide and running towards the middle and towards the outside of the mixer. A flap of the hide is then lifted up and pushed towards the middle of the mixer. This method is quite effective but it is at the same time laborious for the operative, particularly in the case of soft and sticky mixtures which strongly adhere to the roll, and the method is also slow to produce the desired effect because it will be readily seen that a large number of cut-backs would be necessary both from one edge of the hide and from the other in order to achieve the desired homogenisation.

Another method consists of carrying out what are called crossed passes. In this technique, the hide is removed from the roll with the aid of a longitudinal knife, frequently called a "doctor blade" which is applied against the roll by means of counter weights, or by pneumatic jacks, or by any other suitable device. This knife cuts the hide and removes it from the roll, the hide being collected on a table or trough placed under the roll for this purpose. The hide can either be collected in a succession of stacked folds laid down one upon the other concertina fashion, or it can be rolled up on itself. This stack or this roll which is made parallel to the rolls is then taken, turned through 90° and again fed into the mill at right angles to the rolls. This technique is again quite effective but it is necessary to carry out a high number of cross passes in order to obtain the desired homogenisation. These operations which have been described in outline demand the constant presence of operatives and one is furthermore limited as to the size of quantity of material which can be homogenised by the need for the operatives to take the stack or roll from under the rolls, to turn it, to lift it and to feed it afresh onto the rolls. An operative carrying out this work throughout can only handle a limited amount and with mixers of a large size this does not allow one to obtain as much as possible from the equipment.

It is true that for constantly repeated operations applied to identical compositions, the intervention of the operative can be replaced by automatic devices. However this is hardly suitable in the case of varied production, where the operating cycles are very different from one batch to another. One furthermore prefers in practice to resort to a different equipment which is called a "stock blender." Detailed explanations of this equipment will be found in specialised works; for example one may consult the work of Seaman and Merril, "Machinery and Equipment for Rubber and Plastics," New York, 1952, vol. I, p. 47.

The hide, detached from the front of the working roll, passes over return rolls parallel to the working roll and placed above the latter, and redescends into the middle zone between the two principal rolls. In front of and at the level of the return rolls, two rollers placed at right angles to the rolls form a fork where the hide which has been removed from the roll is collected. This fork is mounted on a chassis which is subjected to a reciprocating movement parallel to the axis of the cylinders. The hide is collected whilst forming a pleated strip which falls into the pad in the middle, in a constantly varying zone. One thus obtains very effective mixing without an operative being used, and the operative can easily keep an eye on several mixers which, furthermore, can be charged to their full capacity. Unfortunately the fork subjected to its reciprocating movement exerts a tensile force on the hide, which sometimes exceeds the resistance to break of the rubber. This is particularly the case in mixtures based on silicone rubbers.

According to the present invention there is provided a method of dispersing additives in rubber, comprising feeding rubber and additive to the nip of a pair of closely spaced rolls mounted on parallel axes, whereby a hide of rubber and additive is formed on one of said rolls, cutting a strip from the hide at one axial position relative to said main rolls and feeding the strip to the nip of the rolls at another axial position.

The invention also provides apparatus for effecting this method such apparatus comprising a pair of closely spaced main rolls mounted on parallel axes, means for driving said rolls in opposite directions, whereby a hide of rubber and additive may be formed on one of said rolls, means for cutting a strip from the hide at one axial position relative to said rolls, and means for feeding said strip to the nip of the main rolls at another axial position.

The cutting means is preferably adjustable to allow the width of the strip of hide being cut to be varied as desired, and the angle of the axes of the guide rollers, which preferably form the guide means, relative to the axes of the main rolls is also preferably adjustable. The cut strip from the hide, on passing successively over the two guide rollers, finds itself returned to the main rolls in a zone different from that from which it was removed. By suitably choosing the position of the cutting means and the orientation of the guide rollers it is possible, without exerting tensile force or torsion on the strip which exceeds the strength of the material, even where the latter is low, to ensure in this way extremely efficient mixing without manual operation. The choice of this appropriate position for the cutting means and the appropriate orientation of the guide rollers presents no particular difficulty and can easily be made for each particular mixture which is being dealt with.

In order that the invention may more readily be understood, the following description is given, merely by way of example, with reference to the accompanying drawings, in which:

FIGURE 1 is a schematic side elevation of one embodiment of apparatus according to the invention, all but the essential parts being omitted for clarity;

FIGURE 2 is a schematic top plan view of the apparatus of FIGURE 1 with the operating components included;

FIGURE 3 is a view similar to FIGURE 1 of a second embodiment; and

FIGURE 4 is a view similar to FIGURE 2 of the apparatus of FIGURE 3.

In FIGURES 1 and 2, two main rolls 1 and 3 are mounted on parallel, closely spaced, horizontal axes. Roll 3 is driven by means of motor 12, through gearbox 13, while roll 1 is driven, in the opposite direction, by drive shaft 14 and gearbox 15 at a lower speed than roll 3. End plates 5 and 6 are positioned above the nip of the rolls 1 and 2 to define a trough for holding a pad 4 of rubber and additive.

Mounted on a horizontal shaft 23, are two bronze discs 7 and 8 positioned with their peripheries closely adjacent to the cylindrical periphery of roll 1. The axial positioning and distance between the discs 7 and 8 can be altered as desired by adjustment of abutments or collars 24.

Positioned above the rolls 1 and 3, are two guide rollers 10 and 11, the axes of which are horizontal, but at an angle to the parallel axes of the rolls 1 and 3. The two guide rollers 10 and 11 are each mounted on a separate support 19, which is pivotable about a vertical shaft 20, the angular position of the support being determined by a stud-and-nut arrangement 21 slidable in arcuate slot 22. If desired the roll 11 can be driven by means of pulley 18, belt 17 and pulley 16, the latter being carried by the shaft between gearbox 13 and roll 3.

In use of the apparatus a charge of rubber and additive is fed to the nip above the rolls 1 and 3 to form pad 4. A hide 2 forms on the slower roll 1 and the cutting discs 7 and 8 cut a strip 9, which is fed over guide rollers 10 and 11 back onto pad 4 at a different axial position from that which it was cut. By adjusting collars 24, which if desired can be effected automatically, and by adjusting the angle of guide rollers 10 and 11, which again can be effected automatically, the position from which the strip 9 is cut can be changed. By a suitable adjustment of the rate of rotation of guide roller 11 and of main rolls 1 and 3, the position at which the strip 9 is deposited on the pad 4 can be caused to oscillate axially of rollers 1 and 3.

In the embodiment of FIGURES 3 and 4, like parts have been given the same reference numerals as in FIGURES 1 and 2 but with a factor of 100 added. Thus two parallel axis rollers 101, 103 are driven by motor 112, through gearbox 113, drive shaft 114 and gearbox 115, the roll 101 rotating slower than and in the opposite direction to roll 103. Four guide rollers 110, 110a, 111 and 111a are mounted at an angle to the axes of the rolls 101 and 103, on supports 119, 119a. These are pivotable about vertical shafts 120, 120a and can be held in position by studs and nuts 121, 121a movable in arcuate slots 122, 122a. The guide rollers can be driven through the agency of motor 112, pulleys 116, 116a, belts 117, 117a and pulleys 118, 118a.

Four bronze discs (of which only discs 107a and 108 are visible in FIGURE 4) are mounted on shaft 123 and held axially by collars 124, 124a.

The operation of this apparatus is substantially similar to that of the apparatus of FIGURES 1 and 2 except that two strips 109, 109a are cut from opposite sides of the hide 102 and are fed towards the centre. This positions of the cutting discs, the angles of the guide rollers and the speed of rollers 111, 111a can be varied as before.

The examples below, given in a non-limiting sense, illustrate the invention and show how it may be put into practice.

Example 1

1500 g. of a mixture consisting of a polydimethylsiloxane rubber and of pyrophoric silica in the ratio of 100 parts by weight of rubber to 56 parts by weight of pyrophoric silica are charged on to a mixer having rolls 350 mm. long and 150 mm. in diameter, and provided with a device for taking off and transferring rubber similar to that of FIGURES 1 and 2, the rollers 10 and 11 being of 55 mm. diameter and their axes forming angles of 17° with those of the rolls 1 and 3.

The rubber had a viscosity of about 20 million centipoises at 25° C. and the pyrophoric silica used was Aerosil 2491. This mixture had beforehand been plasticized on a mixer and its Mooney consistency at 25° C. was 74 Mooney units.

The slow roll of the mixer turned at 18 r.p.m. and the fast cylinder 24 r.p.m., giving a frictional ratio of 1.3.

The rolls were spaced 5 mm. apart and the sleeve formed on the slow roll. A cutting system consisting of two bronze discs 70 mm. in diameter was applied to the left edge of the roll, by means of a counter weight arrangement. These discs, with cutting edges, spaced 40 mm. apart, turned freely about their axis and cut off a strip of material the removal of which from the roll was facilitated by a bronze strip placed between the two discs. The strip which was cut off in this way was passed over the idling guide roller 10, and then over guide roller 11 which was driven at a speed of rotation of 50 r.p.m., and finally was passed on to the main rolls. With working conditions fixed in this way, an oscillatory movement which spreads the strip over the whole length of the pad of material is set up spontaneously.

18 g. of a paste consisting of equal parts of polydimethylsiloxane rubber identical to that charged in previously, and of a blue mineral pigment (Ultramarine Blue TBH of Messrs. Lamotte et Coiffard) were then added to the pad of material. The incorporation was then allowed to take place of its own accord and at the end of 2 minutes a mass which was very homogenously pigmented blue was obtained.

By way of comparison the operation was repeated without cutting the strip, and only allowing the friction between the rolls to act. In this case the experiment was stopped at the end of 15 minutes without it having been possible to obtain uniform pigmentation of the mass.

Example 2

1500 g. of a mixture consisting of a methylvinylpolysiloxane rubber (viscosity 20 million centipoises at 25° C.), pyrophoric silica (Aerosil 2491) and (tetramethylethylenedioxy) dimethylsilane, in the ratio of 100 parts of rubber to 26 parts of silica and 1 part of the third constituent, these parts being by weight, are introduced into the mixer described above. The mixture, which has previously been plasticised on a mixer, had a consistency of 22 Mooney units at 25° C.

In order to form the homgenisation strip one proceeded as in Example 1, and 18.75 g. of a 50% paste of 2,4-dichlorobenzoyl peroxide in silicone oil were then added to the pad. At the end of 2 minutes the cutting system was lifted off and the rolls brought together in order to cause the sleeve to pass on to the fast roll. The hide formed was then removed and a sheet 140 mm. square and 2 mm. thick was moulded under pressure. The material so moulded was then heated for 10 minutes to 125° C. at 50 kg./cm.$^2$ pressure, and the vulcanised sheet obtained was then cut into samples which were stretched on a tensometer. A resistance to break of 65 kg./cm.$^2$ and an extension of 575% were obtained, which show that the vulcanisation was correctly carried out and therefore that the mixing achieved under the conditions quoted was very good.

By way of comparison the operation was repeated without cutting the strip and only allowing the friction between the rolls to act. In this case the experiment was stopped at the end of 10 minutes and then, having caused the sleeve to pass on to the fast roll, the hide was removed and a sheet was moulded as above.

The moulded sheet appeared under-vulcanised. In various areas the material seemed barely set and it was easily possible by means of a fingernail to remove a surface layer underneath which the mixture remained soft and sticky.

Example 3

1500 g. of the mixture of rubber, silica and silicone of Example 2 are charged on to the preceding mixer, similar to that illustrated in FIGURES 3 and 4, the rollers 110, 110a, 111, 111a being of diameter 43 mm. and turning freely about their axes, these axes further forming an angle of 12° with those of the mixing rolls.

The sleeve having been formed on the slow roll the two cutting devices were successively applied by means of counter weight arrangements. Each of them consisted of two bronze discs as before (diameter 70 mm., spacing 40 mm.) and carried a strip between the discs to facilitate the removal of the band. The first strip cut off, that of cutters 107, 108 was passed over the two idling rollers 110 and 111 and finally fed into the middle zone of the mixer; similarly the strip cut off by cutters 107a, 108a was passed around idling rollers 110a, 111a.

9 g. of tertiary butyl perbenzoate were then poured on to the pad of material. At the end of 2 minutes the cutting units were lifted, the sleeve transferred to the fast roll, and the hide removed. The mixture obtained was used to mould a sheet in 10 minutes at 150° C. and 50 kg./cm.$^2$, and samples were cut from this sheet. On stretching these on a tensometer a resistance to break of 60 kg./cm.$^2$ and an elongation of 540% were obtained, which showed that the vulcanisation had been correctly carried out.

I claim:

1. A method of dispersing additives in rubber comprising the steps of feeding rubber and additive to the nip defined between a pair of closely spaced rolls mounted on parallel axes, whereby a hide of rubber and additive is formed on one of said rolls, cutting a strip of a width equal to a small fraction of the axial length of the rolls from said hide, at one axial position relative to said main rolls, effective to leave a major portion of said hide intact on said one roll, and returning the strip immediately to the nip of the main rolls at another axial position and in said major portion of said hide remaining on said one roll.

2. The method defined in claim 1, wherein the strip is cut from one axial end of said one roll and fed to the nip of the rolls at the opposite axial end thereof.

3. The method defined in claim 1, wherein the axial position relative to said main rolls, at which the strip is fed to the main rolls, is caused to vary as the strip is fed.

4. The method defined in claim 1, wherein a further strip is cut from said one roll and fed back to the nip of the main rolls.

5. The method defined in claim 1 wherein the rubber and additive have a low mechanical strength.

6. The method defined in claim 1 wherein the rubber is a silicon rubber to which fillers have been added.

References Cited

UNITED STATES PATENTS

| | | | |
|---|---|---|---|
| 1,897,961 | 2/1933 | Snyder | 18—2 |
| 1,963,503 | 6/1934 | Quinton | 18—2 |
| 2,011,685 | 8/1935 | Maynard | 18—2 |
| 2,540,195 | 2/1951 | Engler | 18—2 |
| 2,959,811 | 11/1960 | Curletti | 18—2 |

JULIUS FROME, *Primary Examiner.*

J. R. THURLOW, *Assistant Examiner.*

U.S. Cl. X.R.

264—175; 18—2